Dec. 17, 1935.  C. E. MILLER  2,024,941
RETREADING VULCANIZER FOR TIRES
Filed Dec. 14, 1933  2 Sheets-Sheet 1
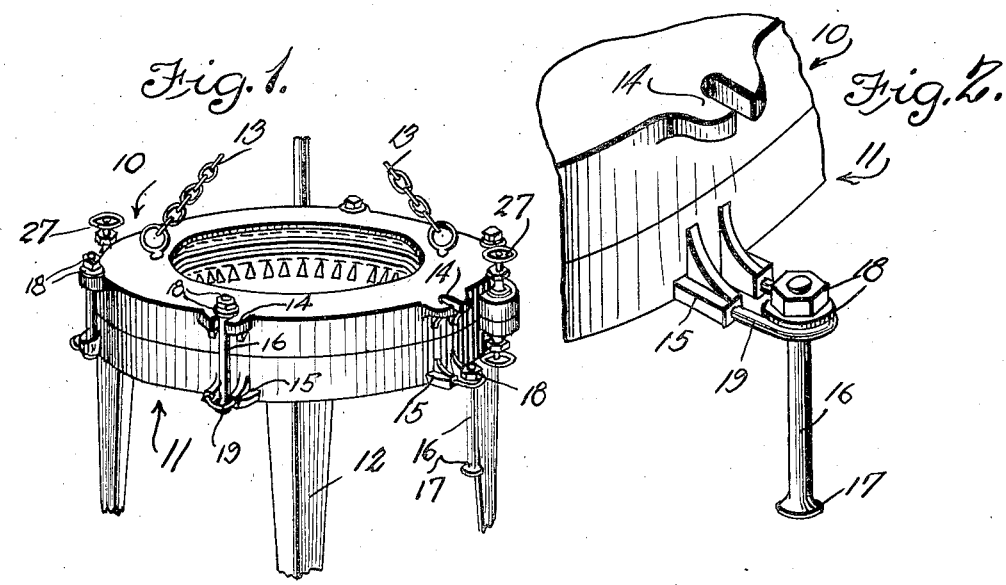
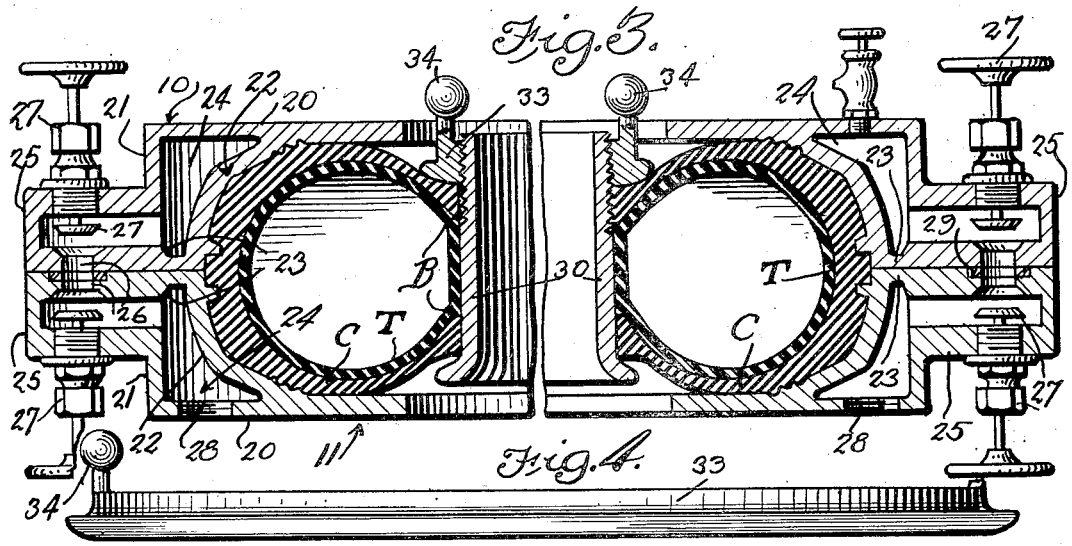
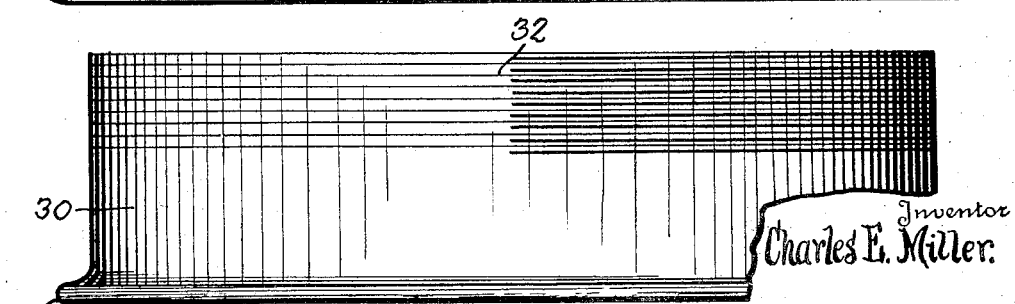

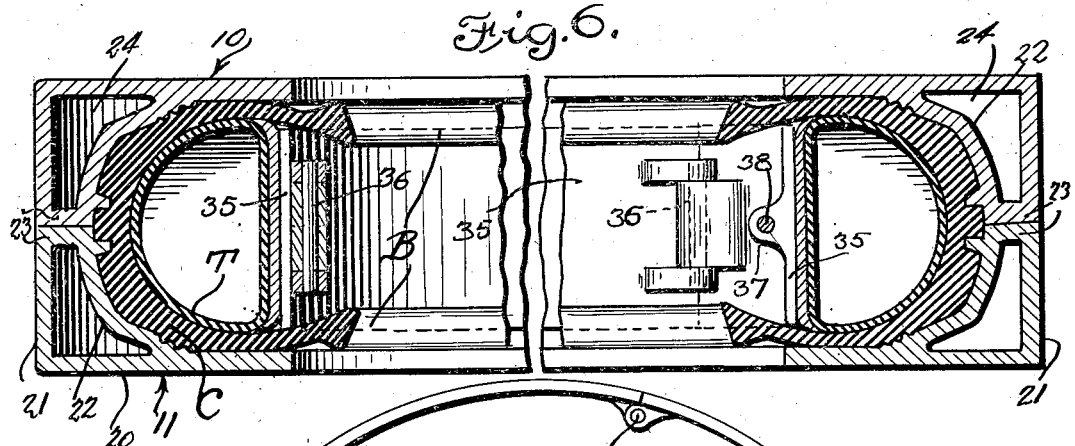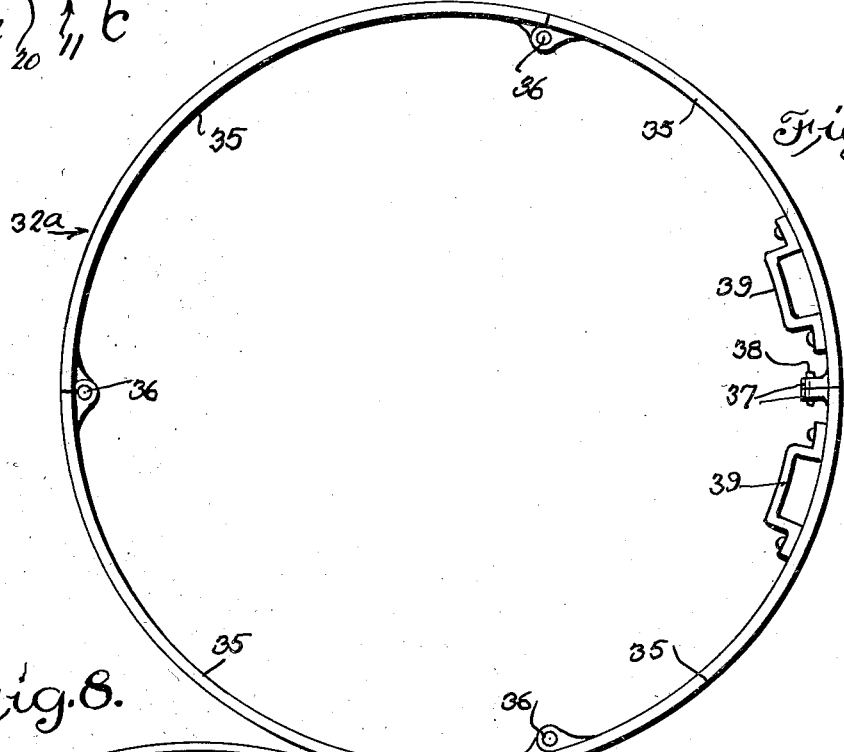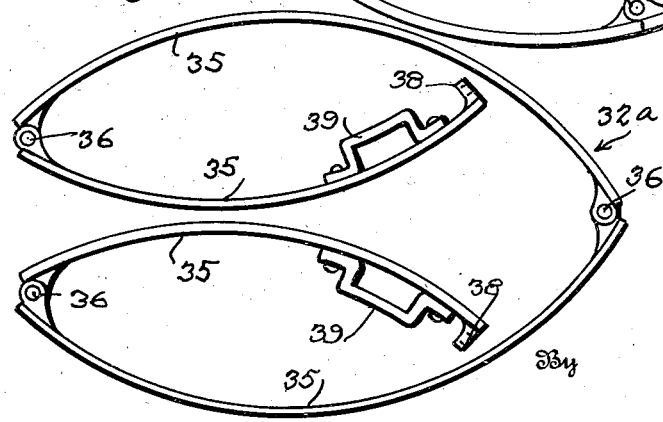

Patented Dec. 17, 1935

2,024,941

UNITED STATES PATENT OFFICE 2,024,941

RETREADING VULCANIZER FOR TIRES

Charles E. Miller, Anderson, Ind.

Application December 14, 1933, Serial No. 702,368

3 Claims. (Cl. 18—18)

This invention relates to certain new and useful improvements in retreading vulcanizers for tires.

An important object of the invention resides in the provision of a retreading vulcanizer for tires wherein the entire tire casing is retreaded in one single operation as distinguished from prior methods and devices that accomplish the retreading in a series of distinct operations.

A further object of the invention is to provide a retreading vulcanizer of the foregoing character embodying an adjustable element permitting the vulcanization and retreading of tire casings of different widths with a standard size apparatus.

A further and important object of the invention is to present only the tread portion of the tire casing to the form or mold of the retreading vulcanizer with the side beads of the tire casing exposed to atmosphere to prevent material application of heat to the beaded portions of the tire casing to obviate any damage or injury that may occur to said bead portions of the tire casing during a retreading operation.

It is a further object of the invention to provide a retreading vulcanizer having mating steam jacketed mold sections to be separated for placement and removal of the tire casing from the vulcanizer with steam supply means for one of the mold sections that in turn is in steam communication with the other mold section with manually operable valves for shutting off steam communication between the two mold sections, so that when the mold sections are separated for the purpose of removing a retreaded tire casing, or for other purposes, steam is confined in the separated mold sections to prevent the chilling of said sections and retaining them preheated to a considerable degree for a subsequent retreading operation.

The invention has for a further object to provide a quickly collapsible rim for the support of an inner tube within the tire casing being retreaded that permits ready access to the tube in the event of necessity for repair or otherwise during a vulcanization operation without removing the tire casing from the vulcanizer.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary perspective view of a retreading vulcanizer for tires constructed in accordance with the present invention showing the two sections of the vulcanizer mold clamped together;

Figure 2 is a fragmentary perspective view showing one of the clamping bolts between the two mold sections disengaged from the upper section and retainingly supported on the lower mold section;

Figure 3 is a cross-sectional view through the assembled mold section, partly broken away, and showing the valve controlled communicating openings between the steam jacketed mold sections and the adjustable screw ring having threaded engagement with the tire casing supporting rim and bead of the tire casing;

Figure 4 is a side elevational view of the adjustable screw ring;—

Figure 5 is a fragmentary side elevational view of the tire casing supporting rim;

Figure 6 is a cross-sectional view of the vulcanizer equipped with a collapsible tire casing supporting rim and illustrating the beaded side portions of the tire casing disposed outwardly of the mold section to be unaffected by heat from the vulcanizer;

Figure 7 is a side elevational view of the collapsible rim removed from the vulcanizer; and Figure 8 is a side elevational view of the rim in collapsed condition.

Referring more in detail to the accompanying drawings and particularly Figs. 1 to 5, there is illustrated a retreading vulcanizer for tire casings, it being understood however that other articles may well be vulcanized within the apparatus with slight modifications, the vulcanizer comprising mold sections 10 and 11, the lower mold section being illustrated as mounted upon supporting legs 12 while the mold section 10 has hoist chains 13 attached thereto to facilitate manipulation and placement of the mold sections in mating relationship.

The tie bolt connection is provided between the two sections 10 and 11 of the vulcanizer for maintaining intimate contact therebetween and as shown in Figs. 1 and 2, the mold sections 10 and 11 carry a series of peripherally projecting apertured lugs 14 and 15 respectively for cooperation with each other by means of tie bolts 16 having their lower headed ends 17 engaged with the lugs 15 with the upper ends of the tie bolts 16 projecting through the apertured lugs 14 and receiving a washer and nut combination 18. To prevent loss of the tie bolts 16 when the mold sections 10 and 11 are separated, each apertured lug 15 carries an outwardly directed loop frame 19 for the support of the tie bolt on the mold section 11 as shown in Figure 2.

Each of the mold sections 10 and 11 is of ring formation and has a side wall 20 and an annular wall 21 projecting at right angles from its outer edge, the two walls being connected by a curved wall 22 so that when the two mold sections 10 and 11 are assembled as shown in Figure 3, the curved walls 22 form a continuously curved tire casing tread engaging portion. The faces of the curved walls 22 of the mold sections engaged by the thread of the tire casing are suitably configurated to produce the desired design upon the tire casing tread, or said faces may have design plates suitably secured thereto. As shown in Figures 3 and 4, the free ends of the annular walls 21 and adjacent ends of the curved walls 22 are connected by a short wall 23 that abuttingly engage when the mold sections 10 and 11 are assembled. The wall arrangement of each mold section provides a steam chamber 24 in each mold section.

A diametrically oposite hollow boss 25 projects outwardly of each mold section for abutting engagememnt when the mold sections are assembled as shown in Figure 3, the hollow bosses communicating with the steam chambers 24, steam communication between the two chambers and hollow bosses being afforded by the registering valve openings 26 in adjacent walls of the hollow bosses 25, said valve openings being controlled by the manually operable valves 27 supported in the outer walls of the hollow bosses 25. Steam supply openings 28 are formed in the wall 20 of the mold section 11, steam communication between the chambers 24 of the two mold sections being controlled by the valves 27. A steam tight connection is established between the hollow bosses 25 by means of the gaskets 29 between the valve openings 26.

An annular adjustable rim 30 is provided for the support of a tire casing and the inner edges of the ring walls 20 are spaced outwardly of the adjustable rim 30, one side edge of the rim 30 carries an outwardly directed annular bead 31 while the other side edge of the rim is threaded as at 32 for the reception of an adjusting ring 33 that is manipulated by means of the handles 34 diametrically carried by the ring.

As shown in Figure 3 of the drawings, a tire casing C is supported in the mating mold sections 10 and 11 and it will be observed that the tire beads B project outwardly beyond the adjacent edges of the side walls 20 of the mold sections and to a position to be removed from the heat zone of the vulcanizer. The tire casing C is supported upon the rim 30 with one bead B engaged with the rim bead 31 while the other tire casing bead B is engaged by the screw ring 33. It will be understood that by adjusting the screw ring 33, tire casings of various widths may be mounted in the vulcanizer for presenting the tread portion of the tire casing C to the curved walls 22 of the mold sections. With the mold sections 10 and 11 assembled as illustrated in Figs. 1 and 3, steam is supplied to the steam chamber 24 through the steam inlet 28 and flows by way of the hollow bosses 25 into the steam chamber 24 of the other mold section, heat radiating to the curved walls 22 for the vulcanization of retreaded portion of the tire casing C. The rubber strips forming the retread are placed in the mold to be engaged by the tire casing and by a single operation, complete vulcanization is accomplished. When it is desired to remove the retreaded tire casing from the vulcanizer, valves 27 are moved into closing relation with the valve openings 26 in the hollow bosses 25, the tie bolt 16 being then disengaged from the apertured lugs 14 upon the mold section 10 to be supported by the loop frames 19 upon the lower other mold section 11, whereupon the mold section 10 is raised by means of the hoist chains 13. In lieu of the usual air or sand bag an inner tube is employed within the tire casing during vulcanization and is retained in position by means of the rim 30 for expansion engagement with the inner walls of the tread portion of the tire casing. In event of injury to the inner tube during vulcanization, the rim 30 may be removed from the mold sections of the vulcanizer without disturbing the tire casing, a new air bag or inner tube substituted and the rim replaced. Also, it is possible to insert a spacing ring between the two mold sections 10 and 11 including the hollow bosses 25 so that tire casings of greatly increased width may be vulcanized in the apparatus.

In the form of invention shown in Figs. 6 to 8, a collapsible rim is substituted for the rigid rim 30 shown in Figure 5, the rim 32a being formed of sections 35 that are hinged together as at 36, a pair of adjacent sections 35 being unhinged and each carrying at its free end an apertured lug 37 to receive a locking pin for holding the several rim sections in expanded circular formation. A handle 39 is carried by the rim sections 35 adjacent the locking connection to facilitate collapsing of the rim, it being understood that the rim 32a becomes quite highly heated during vulcanizing operation.

As shown in Figure 6, the rim 32a is disposed between the side walls of the tire casing C with the tire beads B exposed to atmosphere and removed from the heat zone of the vulcanizer. The inner tube T is interposed between the rim and inner wall of the tire casing and is used in lieu of the usual expensive air bags or fan bags. In the event of injury to the inner tube T, the collapsible ring 32a is easily removed from the tire casing to permit the substitution of a new tube.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention as claimed.

I claim:—

1. In a retreading vulcanizer of the character described, a pair of mold sections adapted to be clamped together and constructed and arranged for the support of a tire casing with the tire beads located exteriorly of the mold sections, a steam chamber in each mold section, means forming communication between the steam chamber, means for supplying steam to one of the chambers, an annular rim for the support of the tire casing and a tire engaging ring having threaded engagement with the rim with the rim detachable from the mold without disturbing the mold sections.

2. In a retreading vulcanizer of the character described, a pair of mold sections adapted to be clamped together and constructed and arranged for the support of a tire casing with the tire beads located exteriorly of the mold sections, a steam chamber in each mold section, means forming communication between the steam chambers, a valve carried by each mold section for shutting off communication between the mold sections whereby the sections may be separated with steam confined in the chamber thereof, and means for supplying steam to one of the chambers, an annular rim for the support of the tire casing and a tire engaging ring having threaded engagement with the rim with the rim detachable from the mold without disturbing the mold sections.

3. In a retreading vulcanizer of the character described, a pair of mold sections adapted to be clamped together and constructed and arranged for the support of a tire casing with the tire beads located exteriorly of the mold sections, a steam chamber in each mold section, means forming communication between the steam chamber, means for supplying steam to one of the chambers, an annular rim for the support of the tire casing and a tire engaging ring having threaded engagement with the rim with the rim detachable from the mold without disturbing the mold sections, and an inflated inner tube interposed between the tire casing and rim.

CHARLES E. MILLER.